United States Patent [19]

Rich

[11] Patent Number: 4,611,115

[45] Date of Patent: Sep. 9, 1986

[54] LASER ETCH MONITORING SYSTEM

[75] Inventor: Theodore C. Rich, Berkeley Heights, N.J.

[73] Assignee: Richland Glass Company, Inc., Richland, N.J.

[21] Appl. No.: 690,868

[22] Filed: Jan. 14, 1985

[51] Int. Cl.⁴ .......................... H01J 3/14; G02B 23/00
[52] U.S. Cl. .................................... 250/216; 350/501; 350/172
[58] Field of Search .................. 250/216, 221, 239; 356/124; 353/39; 350/501, 569, 117, 121, 169, 171, 172, 322

[56]  References Cited

U.S. PATENT DOCUMENTS 4,560,866  12/1985  Takenouchi et al. ............... 250/216

Primary Examiner—Eugene R. LaRoche
Assistant Examiner—D. C. Mis
Attorney, Agent, or Firm—Harvey B. Jacobson

[57] ABSTRACT

An optical system transmits and reflects a laser beam along a common optical path between a laser generator and the target area on a workpiece. Illuminating light is transmitted along a portion of the optical path to the workpiece and is reflected therefrom to form an image of the target area projected onto a display screen. The reflected laser beam is focused at a detection point to monitor etch rate while the illuminating light is reflected adjacent thereto from the optical path to provide a visual indication of the laser beam locations on the workpiece corresponding to the image being simultaneously displayed.

12 Claims, 5 Drawing Figures

LASER ETCH MONITORING SYSTEM

BACKGROUND OF THE INVENTION

This invention relates in general to the monitoring of a workpiece being surface treated by impingement of a focused laser beam thereon, and more particularly to monitoring of a laser beam etching operation on the surface of a wafer type workpiece.

The use of a laser beam to etch the surface of a small workpiece, such as a semi-conductor wafer, is already well known as well as the monitoring of the etch rate. The use of a relatively low intensity light transmitted to a target along the path of a laser beam for illumination of the target surface being treated by the laser beam is also known. In connection with very small workpieces, however, direct visual observance of the workpiece for monitoring purposes and for precise positional control of the laser beam focus spot, presents a special problem to which the prior art is not specifically addressed.

It is therefore an important object of the present invention to provide a device through which precise positioning of a laser beam spot on a wafer surface is made possible for reproducible etching purposes by accurate measurement of etch rate and visual image display monitoring.

SUMMARY OF THE INVENTION

In accordance with the present invention, laser beam reflectors are selectively adjusted through positional scan controls to adjust the optical path from a low power laser generator through an aperture onto the surface of a wafer for monitoring purposes. The laser beam is thereby positioned at selected points within a target area of ¼ square inch, for example, on the wafer surface. By means of selectively positioned beam splitters in the optical path of the laser beam, the reflection of the laser beam from the wafer surface is positioned at a detection point on the optical path axis in spaced adjacency to the laser generator to enable detection of laser beam impact on the target and monitoring of its etch rate.

Low intensity illuminating light is transmitted by fiber optics to the target surface along a portion of the optical path of the laser beam. Reflection of the illuminating light from the target surface is projected away from the optical path and adjustably focused onto a display screen for visually monitoring an image of the surface being etched. The reflected illuminating light is also reflected from the optical path adjacent to the aforementioned detection point to provide a visual indication of the beam position on the detector.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENT

Figure 1:
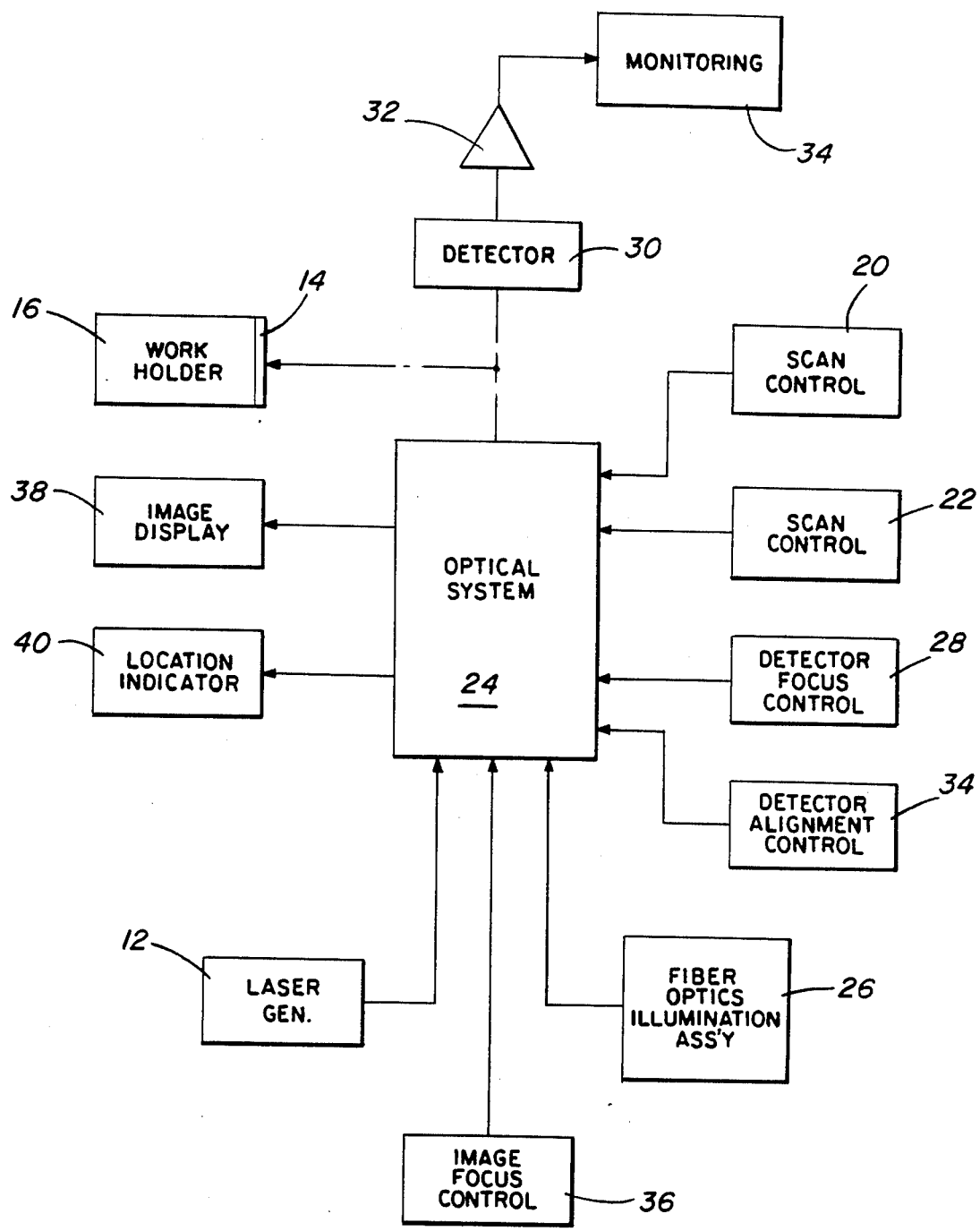
FIG. 1 is a block diagram schematically illustrating the system associated with the present invention.

Referring now to the drawings in detail, FIG. 1 diagrams a system generally referred to by reference numeral 10 by means of which the output of a laser beam generator 12 is applied to a target area on a workpiece 14 held in position by a suitable holder 16. The particular environment for the present invention involves the etching of a relatively small area on a wafertype workpiece 14 and the monitoring thereof by a laser beam scanning the target surface area on the workpiece under manual scan controls 20 and 22 as diagrammatically shown in FIG. 1. The scanning control devices 20 and 22 are respectively displaceable in perpendicular directions to shift the axis of an optical path established by an optical system 24 through which the laser beam is to various spot locations on the wafer workpiece 14. The entire target surface area on the wafer workpiece is illuminated by relatively low intensity light applied through the optical system from a fiber optic light assembly 26. Also associated with the optical system 24 is a micrometer focus adjustment control 28 by means of which reflections of the laser beam from the target surface area may be properly directed onto a signal detector 30 operatively connected by an amplifier 32 to a chart recorder 34 on which etch rate is registered. A second micrometer control 34 is utilized to manually align the reflected laser beam with the detector 30. The illuminating light reflected from the target surface is focused by means of a control 36 onto a wafer image display 38. The reflections of the laser beam from the spot locations on the target surface are shown on a spot location indicator 40.

Figure 2:
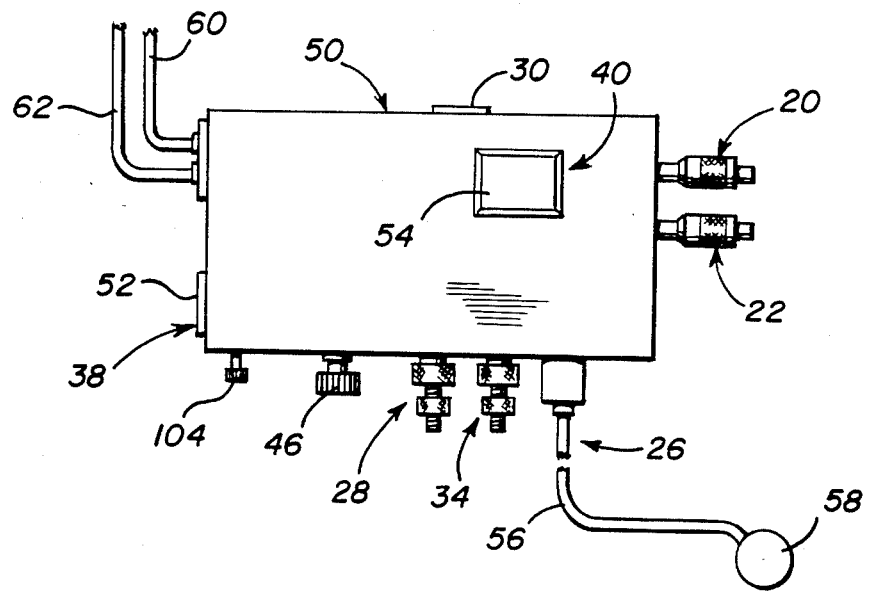
FIG. 2 is a top plan view of a typical apparatus associated with the system depicted in FIG. 1.

FIG. 2 illustrates by way of an example, a housing 50 enclosing components forming the system 10 depicted in FIG. 1. The housing mounts an image screen 52 associated with the wafer image display 38 aforementioned, and a screen 54 associated with the indicator 40 having appropriate coordinate markings thereon. Spot positioning controls 20 and 22 are shown projecting from one end of the housing 50. The fiber optics assembly 26 is shown connected to the housing and includes a fiber bundle 56 and a source of illuminating light 58. A focus control 46 for the image display is shown adjacent to screen 52 while micrometer controls 28 and 34 for respectively focusing and aligning the laser beam with respect to the detector 30 also project from housing 50. Cables 60 and 62 respectively connect the amplifier 32 and laser power supply to the system 10 within housing 50.

Figure 3:
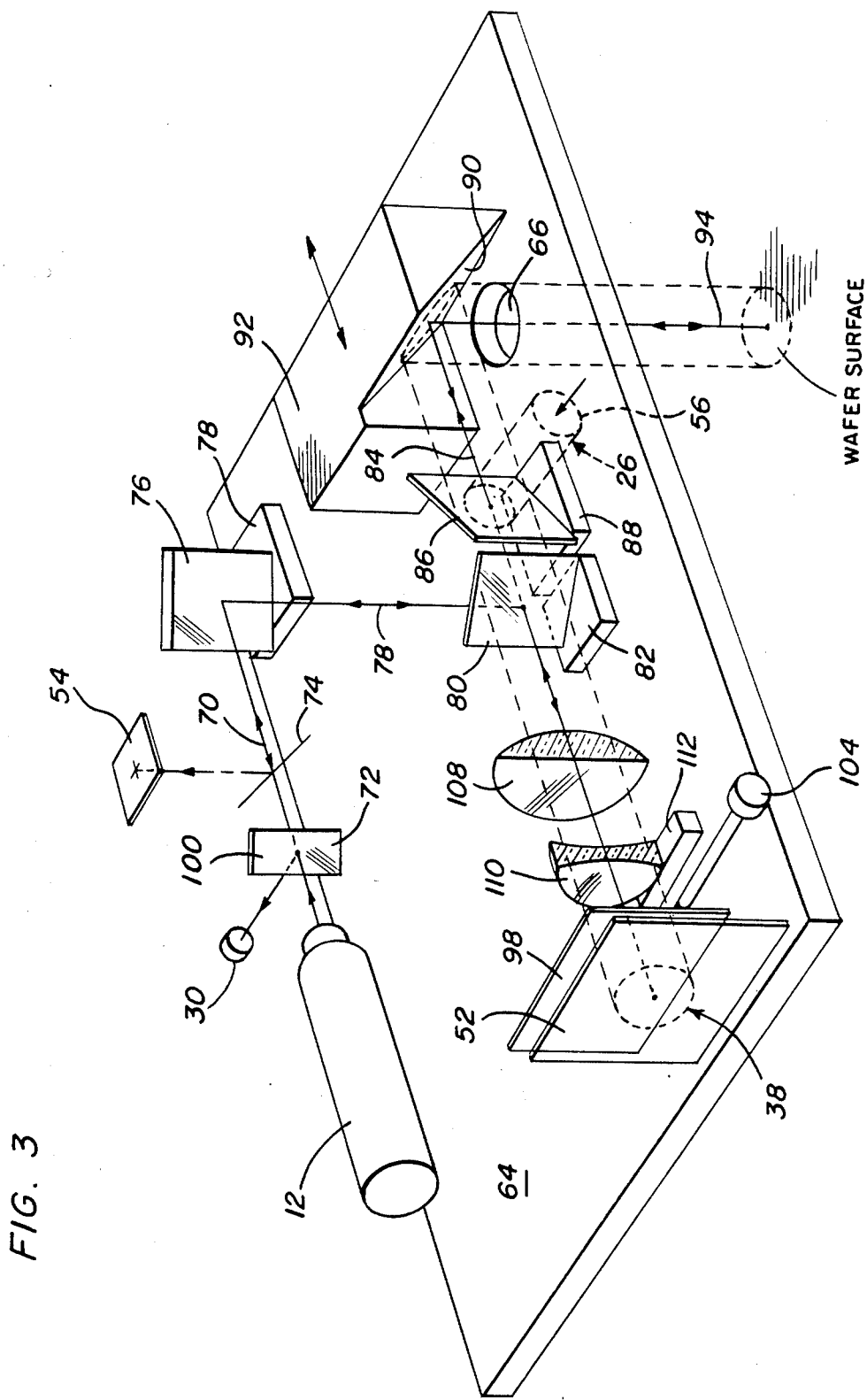
FIG. 3 is a simplified perspective view of the optical arrangement within the apparatus shown in FIG. 2.

FIG. 3 illustrates in greater detail the system 10 schematically depicted in FIG. 1. As shown, the components of the system are mounted on a base plate 64 of the housing within which an aperture 66 is formed overlying the wafer 14 in order to limit transmission of a laser beam to be directed onto the wafer and be reflected therefrom along the common optical axis. The laser beam generator 12 is affixed to the base plate and is adapted to emit radiation forming the laser beam along a portion of the optical path denoted by reference numeral 70. The laser beam radiation emitted from the generator 12 is accordingly transmitted through a beam splitter 72 and a light reflector 74, fixed to the base plate, before the beam impinges on a laser beam reflector 76 fixed to a mount 78 displaceable in one (Y) direction by control 22 as aforementioned in connection with FIG. 1. The reflector 76 is adjustably positioned by control 22 in order to reflectively extend the optical path along an optical axis portion 78 to a beam splitter 80 fixed to a mount 82. The mount 78 is carried by mount 82 and is displaceable relative to mount 82 by control 22 as shown in FIG. 5 by way of example. Accordingly, the reflector 76 is selectively adjustable in the one (Y) direction relative to the reflector 80 which is in turn adjustably positioned along two perpendicular directions by focus control 28 as aforementioned. The beam splitter 80 reflects the laser beam for transmission along yet another optical axis portion 84 as shown in FIG. 3 before the laser beam impinges on a second beam splitter 86 carried by a mount 88 for displacement in two perpendicular directions by alignment control 34 as aforementioned. The laser beam is accordingly transmitted along the optical axis portion 84 to a reflector 90 mounted on a block 92 which is displaceable in one (X) direction by the aforementioned control 20. The reflector 90 extends the optical path along a final optical axis portion 94 through the aperture 66 in order to impact on the wafer 14. It will therefore be apparent that positioning of the reflectors 76 and 90 in perpendicular directions through controls 20 and 22 will be operative to adjust the optical path for scanning the target surface 96 as depicted by the image shown in FIG. 4 in order to monitor an etching operation. The laser beam is reflected from the wafer at the end points 98 of the target surface along the same optical path established by the reflectors 76 and 90.

The laser beam transmitted from the generator 12 to the target surface on wafer 14 extends through the beam splitter 78 so that illuminating light from the relatively low intensity light source 58 may be introduced through fiber optic bundle 58 of the fiber optics light assembly 26. Thus, the illuminating light will impinge on the beam splitter 84 at the point through which the laser beam is transmitted in order to be reflected along the optical axis portion 84 of its optical path for illumination of the wafer. The surface of the wafer 14 illuminated by the light from source 58 is reflected and returns along the same optical axis portions 84 and 78.

The reflectors 90 and 76 are adjusted in order to focus the laser beam reflected along the common optical path at a detection point 100 on the optical axis portion 70 adjacent to the laser generator 12. The beam splitter 72 intersects the optical axis portion 70 at the detection point 100 in order to reflect the returning reflected laser beam onto the detector 30 for registering the etch rate as aforementioned in connection with FIG. 1. The beam splitter 74 is located adjacent to the beam splitter 72 at the detection point 100 and is operative to direct the reflection of the laser beam onto display screen 54 in order to visually indicate detection of the laser beam by detector 30.

Figure 4:
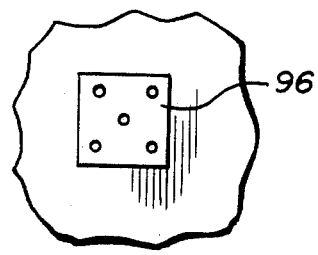
FIG. 4 shows a typical workpiece image display.
Figure 5:
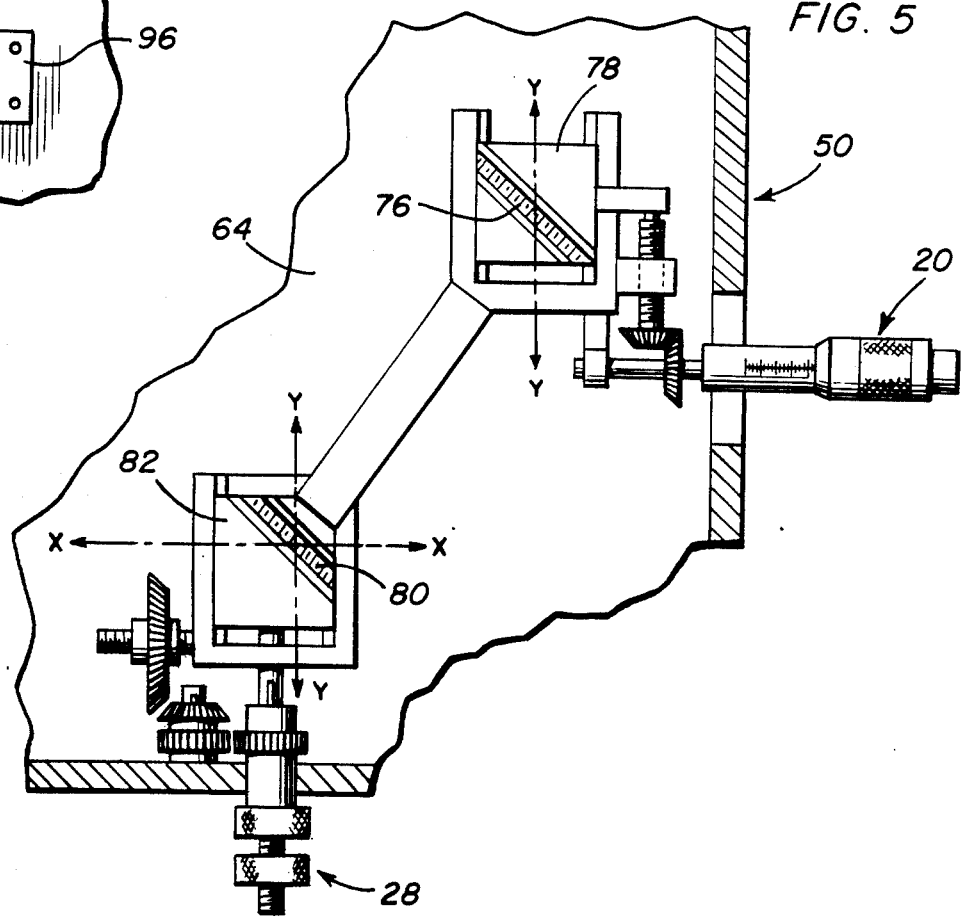
FIG. 5 is a partial top section view of the apparatus shown in FIG. 2, showing some of the positional controls.

A portion of the illuminating light reflected from the wafer 14 also extends through the beam splitter 80 and is projected by means of the fixed concave lens 102 and convex lens 110 to form an image 96 as shown in FIG. 4 on the screen 52 of the wafer image display 38. The convex lens 110 is fixed to a mount 112 which is displaceable in one adjustment direction by control 46 in order to focus the image formed by the reflected illuminating light beam on the screen 52. Accordingly, the image 96 of the target surface being treated will be visible on the screen 52 for monitoring by the operator. A multi position mirror device 98 is disposed between lens 110 and the screen 52 as schematically shown in FIG. 3 for angular adjustment through control knob 104. Depending on the position of mirror devise 98, an end view or top view of the wafer will be displayed on screen 52.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a device for generating a laser beam, an optical system for directing said laser beam along an optical path onto a target, means connected to the optical system for focusing the laser beam at selected end points of the optical path on the target, a source of illumination and means for directing the illumination from said source along the optical path of the laser beam onto the target, the improvement including scan control means connected to the optical system for displacing said laser beam between said end points on the target, an image display screen, means for projecting the illumination reflected from the target onto the display screen, means for focusing images of the target formed by the projected illumination on the display screen and a housing enclosing the optical system and mounting the display screen, the scan control means and the focusing means.

2. The improvement as defined in claim 1 further including multiposition mirror means for selecting different viewing images of the target to be projected onto the display screen.

3. The improvement as defined in claim 2 including means detecting the laser beam for monitoring treatment of the target.

4. The improvement as defined in claim 3 including means responsive to reflections of the laser beam from the target for visually indicating detection of the laser beam by said detecting means.

5. The improvement as defined in claim 4 wherein the detecting means includes a beam splitter intersecting the optical path between the laser beam generating device and the illumination reflecting means, a signal detector receiving radiation reflected by the beam splitter from the optical path, and recording means operatively connected to the detector for measuring of said treatment of the target.

6. The combination of claim 5 wherein said optical system includes selectively adjustable beam reflecting means for establishing said optical path between the reflection responsive means and the workpiece, and selectively adjustable beam splitting means for directing the laser beam along said optical path between the source of illumination and the projection means, said housing having an aperture through which the laser beam is directed between the beam reflecting means and the workpiece.

7. The improvement as defined in claim 2 wherein said optical system includes selectively adjustable beam reflecting means for establishing said optical path between the reflection responsive means and the workpiece, and selectively adjustable beam splitting means for directing the laser beam along said optical path between the source of illumination and the projection means, said housing having an aperture through which the laser beam is directed between the beam reflecting means and the workpiece.

8. The improvement as defined in claim 1 including means detecting the laser beam for monitoring treatment of the target.

9. In combination with apparatus for generating a high intensity laser beam to monitor etching of the surface of a workpiece and a source of low intensity illumination, the improvement comprising beam reflecting means for establishing a common optical path along which said laser beam is transmitted from the generating apparatus to the surface of the workpiece, positioning control means connected to the beam reflecting means for adjusting impact of the laser beam with the surface at selected end points thereon, means for detecting transmission of the laser beam from the generating apparatus to the beam reflecting means at a detection point therebetween, beam splitting means intersecting the optical path for focusing reflection of the laser beam from the end points on the surface at said detection point, projection means for visually displaying images of the surface formed by reflection of the illumination from the surface transmitted through the beam splitting means away from the common optical path, and adjusting means for changing the images of the surface being displayed by the projection means.

10. The improvement as defined in claim 9 including housing means enclosing the beam reflecting means, and light transmitting means for directing said illumination from the source into the housing means through the beam splitting means to the workpiece along the optical path.

11. The improvement as defined in claim 10 including visual indicating means intersecting the optical path between the detector point and the beam reflecting means for visually indicating reflection of the laser beam from the surface transmitted through the beam splitting means in aligned relation to the optical path.

12. The improvement as defined in claim 9 including visual indicating means intersecting the optical path between the detector point and the beam reflecting means for visually indicating reflection of the laser beam from the surface transmitted through the beam splitting means in aligned relation to the optical path.

* * * * *